Aug. 2, 1938.     N. J. KROLL ET AL     2,125,506
VEHICLE HUB CAP
Filed Oct. 2, 1935

INVENTORS
Samuel Kroll and
Nathan J. Kroll
BY
Thredy and Gannon
THEIR ATTORNEYS

Patented Aug. 2, 1938

2,125,506

UNITED STATES PATENT OFFICE 2,125,506

VEHICLE HUB CAP

Nathan J. Kroll and Samuel Kroll, Chicago, Ill.

Application October 2, 1935, Serial No. 43,158

10 Claims. (Cl. 301—108)

This invention relates to a vehicle hub cap.

It is an object of this invention to provide an improved vehicle hub cap which is relatively simple and inexpensive in construction and efficient in use.

Another object of the present invention is to provide a hub cap which is particularly adapted for use in conjunction with baby carriages and the like.

Heretofore in the art of baby carriages and like vehicles it has been the customary practice to attach the hub cap to the hub of the carriage by bending yieldable fingers, formed on the hub cap, around the spokes of the wheel. This practice is objectionable for a number of reasons among which is the fact that the operation of bending and unbending these fingers eventually causes the same to crystallize and break off, and the attachment and removal of such hub caps is expensive from the standpoint of both time and labor. Furthermore, this arrangement causes the attaching fingers to become loose and rattle by reason of their contact with the spokes of the wheel. A further object of the present invention therefore is to provide a hub cap and means for attaching the same to a wheel in such a manner that it will not work loose or rattle.

Another object of the present invention, therefore, is to provide a hub cap for a baby carriage or like vehicle which may be attached to and removed from the hub of the same in a minimum of time and with a minimum of labor and without bending any part or parts thereof around the spokes of the wheel.

Other objects will appear hereinafter.

The invention consists in the novel combination and arrangement of parts to be hereinafter described and claimed.

The invention will be best understood by reference to the accompanying drawing showing the preferred form of construction, and in which.

Figure 1:
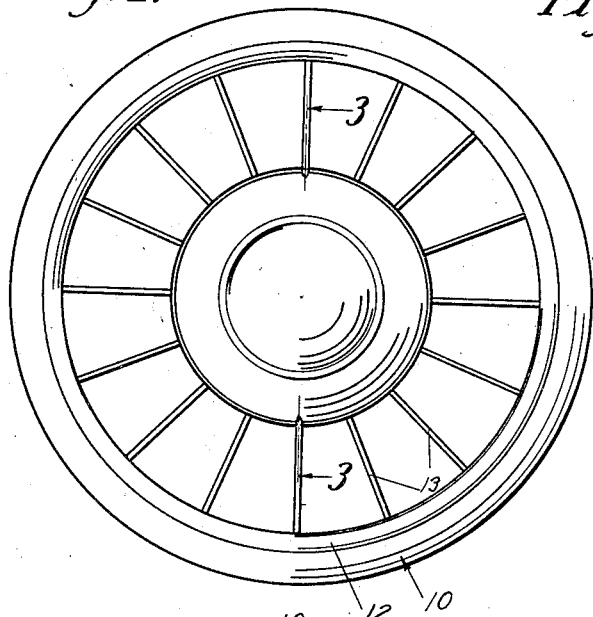
Fig. 1 is a side elevational view of a vehicle wheel showing a preferred form of the present invention associated therewith.
Figure 2:
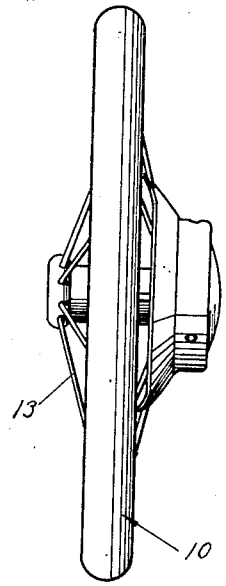
Fig. 2 is an edge elevational view of the wheel shown in Fig. 1.

A vehicle or baby carriage wheel having a preferred form of the present invention associated therewith is generally indicated at 10 in the drawing and comprises a hub 11, a felloe 12, and spokes 13 which are attached at their radially inner ends to the hub 11 and at their radially outer ends to the felloe 12.

Arranged in the hub 11 is a cylindrical bushing 14 and carried by this bushing 14 is a latch member 15 to which a latch element 16 may be removably attached, the latch element 16 being carried by the axle of the vehicle.

Figure 3:
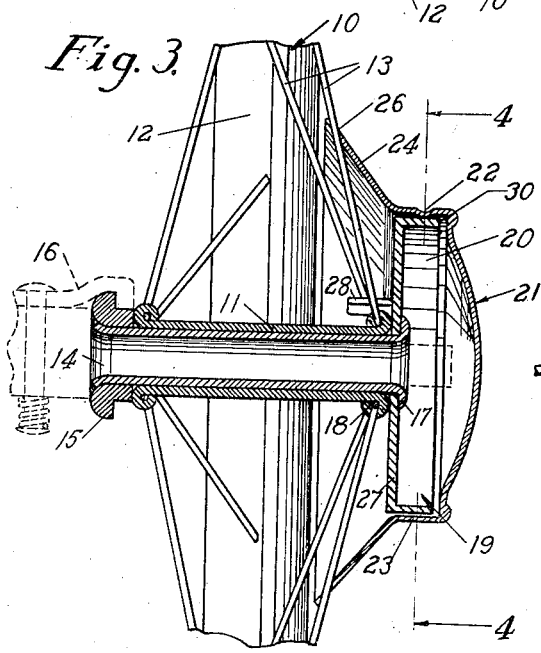
Fig. 3 is a sectional view on line 3—3 in Fig. 1.

The bushing 14 has a flanged portion or collar 17 formed at its axially outer end, as shown in Fig. 3 and mounted on the bushing 14 between the flange or collar 17 and the flanged outer end portion 18 of the hub 11 is a disc or supporting member which is generally indicated at 19.

Releasably mounted upon the wall 20 of the disc or supporting member 19 is a hub cap 21 and this hub cap 21 is releasably attached or latched to the wall 20 of the disc or supporting member 19 by means of latching indentations 22 which are formed in the wall 23 of the hub cap 21.

The hub cap 21 also includes a substantially annular flange 24 and formed in the peripheral edge 25 of the flange 24 is a predetermined number of notched portions or recesses 26 which are adapted to receive a corresponding number of the spokes 13 of the wheel.

Figure 4:
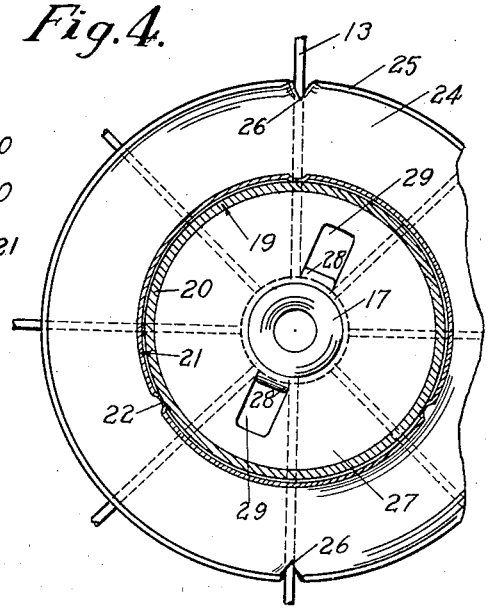
Fig. 4 is a sectional view on line 4—4 in Fig. 3.

Formed on the wall 27 of the supporting disc 19 are laterally projecting tongues or arms 28 which are formed as cut-out portions 29 in the wall 27 of the supporting member 19 (Fig. 4).

In the use of the present invention the disc or supporting member 19 is mounted upon the axially outer end portion of the bushing 14 so that the wall 27 of the same bears against the flanged outer end portion 18 of the hub 11, the arms or tongues 28 being projected between adjacent spokes 13 (Figs. 3 and 4), and the axially outer end portion 17 of the bushing 14 being swedged over the axially outer side of the wall 27 of the disc or supporting member 19 so as to retain the latter upon the bushing 14. The hub cap 21 is then slidably inserted upon the wall 20 of the disc or supporting member 19 to which it is releasably and frictionally latched by means of the latching indentations 22, the notched portions 26, which are formed in the peripheral edge 25 of the flanged portion 24 of the hub cap 21, receiving a corresponding number of the spokes 13 of the wheel 10.

When the hub cap 21 is thus mounted in its supporting member 20 it is prevented from rattling as well as from turning, relative to the wheel 10 and the spokes 13, by reason of the reception of certain of the spokes 13 in the notches or recesses 26 and by reason of the frictional engagement of the cap 21 with the supporting disc 20 and the fact that the arms 28 project between adjacent pairs of spokes 13 (Figs. 3 and 4).

In order to remove the hub cap 21 from the supporting member or disc 20 it is merely necessary to grasp the hub cap 21 and slide the same axially off from the disc or supporting member 19 (left to right, Fig. 3) and in this manner the prior art practice of uncoiling or unbending the yieldable fingers of the hub cap from around the spokes of the wheel is eliminated and the amount of time, labor, and expense involved in mounting the hub cap 21 on the hub is minimized and the cost or expense involved in replacing the prior art type of hub cap 21, which employs the aforesaid bendable fingers, is eliminated, and the rattling incidental to mounting the hub cap on the hub structure, as in the prior art practice hereinbefore referred to is eliminated.

It will be noted that when the hub cap 21 is mounted upon the supporting structure or disc 20 the interior 30 of the hub cap 21 provides a recess for the reception of the mounting or supporting circuit 20 (Fig. 4).

While we have illustrated and described the preferred form of construction for carrying our invention into effect, this is capable of variation and modification, without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A vehicle hub structure comprising a hub member having spokes attached thereto, a bushing arranged in the bore of the said hub member, a cap supporting member mounted upon the axially outer end portion of said bushing, said bushing having an axially outer end bent back upon itself against the axially outer wall of said supporting member, and a hub cap removably mounted upon said supporting member, said hub cap having a plurality of latch elements formed thereon and said latch elements being latchingly and frictionally engageable with the said supporting member, said hub cap including a flange having a plurality of notches or indentations formed in its peripheral edge for the reception of the spokes of a wheel.

2. A vehicle hub structure comprising a tubular hub member having spokes attached thereto, a tubular bushing arranged in the said hub member, a supporting disc arranged upon the axially outer end portion of the said tubular bushing, means for retaining the said supporting disc upon the axially outer end portion of said tubular bushing, a hub cap including an annular skirt portion and removably mounted upon said supporting disc, said disc including a substantially annular mounting flange and said skirt having a plurality of notches or indentations formed in its peripheral edge for the reception of the spokes of a wheel, said hub cap having latch elements formed therein and said latch elements being frictionally and releasably engageable with said mounting flange on the supporting disc.

3. A vehicle hub structure comprising a hub member, a bushing member arranged in the bore of said hub member, a cup-shaped supporting member mounted upon the axially outer end portion of said second-named member and the latter having an axially outer end portion bent back upon itself against the axially outer wall of said supporting member securing the latter against the axial extremity of said hub member, a hub cap removably mounted upon said supporting member, said hub cap including means for releasably latching the same to said supporting member, said hub cap including a substantially annular flange having notches or recesses formed in its peripheral edge for the reception of spokes of a wheel and said supporting member having a punched-out tongue extended between adjacent spokes.

4. In a vehicle wheel, a tubular hub portion, a bearing member within said hub portion, a hub cap including a portion providing a recess, and means for detachably mounting the said hub cap with the said wheel including a member receivable in said recess and secured to said wheel between said tubular portion and said bearing portion adjacent the axial extremity of the latter and having a laterally extending punched-out tongue portion projected between the spokes of the wheel, said hub cap having a peripheral edge with slotted portions therein for the reception of spokes of the wheel.

5. In a vehicle wheel, a tubular bushing, a tubular hub member embracing said bushing and having axial end portions supportably engaging spoke members, a hub cap mounting including a cup-shaped member supported on said bushing near an axial extremity thereof, the said bushing having axial edge parts bent back upon itself against said cup-shaped mounting to secure the latter against the adjacent turned back edge parts of said hub member, the opposite extremity of said bushing being peened to prevent removal from said hub member, and a hub cap including a recessed portion latchingly receivable on said cup-shaped mounting and having an annular skirt provided with slotted portions embracing wheel spokes.

6. In a vehicle wheel, a tubular bushing, a tubular hub member embracing said bushing and having axial end portions supportably engaging spoke members, a hub cap mounting including a cup-shaped member supported on said bushing near an axial extremity thereof, the said bushing having axial edge parts bent back upon itself against said cup-shaped mounting to secure the latter against the adjacent turned back edge parts of said hub member, the opposite extremity of said bushing being peened to prevent removal from said hub member, a hub cap including a recessed portion latchingly receivable on said mounting member, and a skirt fitting closely against said spokes and having a slot in its periphery interfitting with one of said spokes to prevent rotative movement of the cap relative to the wheel.

7. A vehicle hub structure comprising a central tubular bearing member embraced by a tubular hub member, the latter having axial edge parts supportably engaging spoke members, a hub cap mounting member supported on said bearing member and having a wall part bearing against the turned back edge parts of an extremity of said hub member with the corresponding axial edge parts of the said bearing member bent back against the opposite wall part of said mounting member to firmly clamp the latter between said hub member and the bearing member, said mounting member having an extended tongue part adapted to lie between adjacent wheel spokes and said bearing member being provided with means at its axial extremity opposite said mounting member for preventing withdrawal from said hub member.

8. A vehicle wheel comprising a tubular hub having its axial end portions supportably engaging spokes, a tubular bushing having a headed portion at one of its axial ends and inserted through said hub, together with hub cap mounting means for mounting caps with cup-like receiving formations, said mounting means being in the form of a shallow annular cup apertured in its bottom to fit onto said bushing behind said headed end portion thereof, said bushing being flared at its opposite end to force the headed end portion thereof against the bottom of said cup-like mounting to force the latter against a corresponding end of said hub member, said mounting member having a lateral tongue projection extending between adjacent wheel spokes to prevent rotation of the mounting member relative to said wheel.

9. The wheel structure defined in claim 6, and further characterized by the provision of an integral tongue struck from said hub cap mounting and extending between adjacent spokes, whereby to prevent rotative movement of said hub cap and mounting member, or either of the same, relative to said wheel.

10. In combination, a carriage wheel including a hub structure and spokes extended therefrom, said hub structure having a cup-shaped cap mounting supported thereon, said cap mounting having a tongue projected between adjacent spokes to prevent the mounting from turning relative to the hub structure, and a hub cap in the form of a member having a skirt portion flared in conical fashion and surmounted by a cylindrical crown dimensioned to fit firmly onto the circumferential side portions of said mounting member with the edge of said skirt fitted closely against said spokes, said skirt having notched means interfitting with one of said spokes whereby to prevent turning movement of the hub cap relative to the mounting member and said wheel.

NATHAN J. KROLL.
SAMUEL KROLL.